Jan. 17, 1961 M. WEINSTOCK 2,968,291
CONTROLLED ACCELERATION PERSONNEL ESCAPE THRUSTER
Filed Jan. 2, 1958
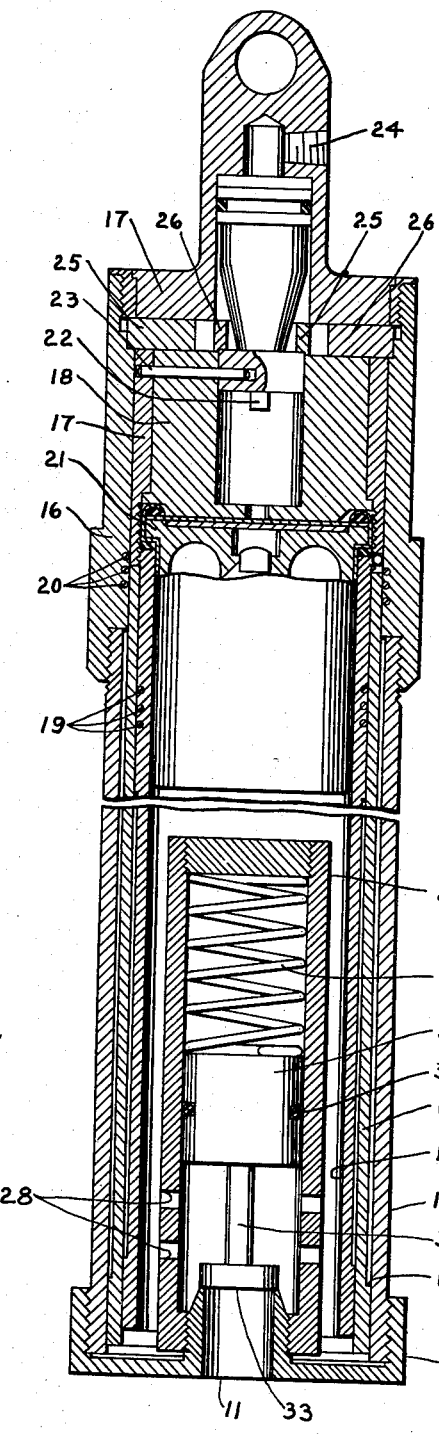
FIG.3.
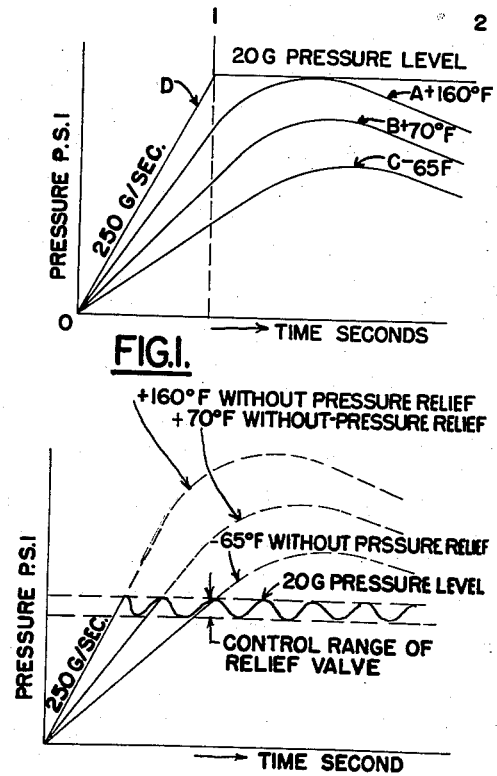
FIG.1.
FIG.2.
INVENTOR.
MANUEL WEINSTOCK
BY
W. E. Thibodeau, I. J. Lynch & H. R. Johns United States Patent Office 2,968,291
Patented Jan. 17, 1961

2,968,291
CONTROLLED ACCELERATION PERSONNEL ESCAPE THRUSTER

Manuel Weinstock, Philadelphia, Pa., assignor to the United States of America as represented by the Secretary of the Army Filed Jan. 2, 1958, Ser. No. 706,882

2 Claims. (Cl. 123—24)

(Granted under Title 35, U.S. Code (1952), sec. 266)

The invention described herein may be manufactured and used by or for the Government for governmental purposes without the payment of any royalty thereon.

This invention relates to personnel escape catapults or thrusters, and more specifically to a device which functions (1) to accelerate a mass with a desired rate of acceleration change and (2) thereafter to apply to this mass an acceleration which is maintained within a desired range and is unaffected by a considerable variation in temperatures.

The design requirements for most personnel escape thrusters or catapults incorporate limits on the acceleration and on the rate of change of acceleration which may be imposed on the seat occupant. The limits currently used are 20 G maximum acceleration and 250 G per second maximum rate of change of acceleration. Present conventional catapults attempt to approach this ideal characteristic through careful selection of the interior ballistic parameters and of the propellants. The performance resulting from this design concept is such that, in order to stay within design requirements at a high temperature condition (160° F.), there is a corresponding decrease in performance when operating at a low temperature condition (−65° F.). Since the final velocity imparted to the mass is proportional to the area enclosed by the pressure-time curve, it is evident that there is a definite loss in performance, not only when operating below the maximum allowable temperature but also from the limitations imposed by the chemical characteristics of the propellant.

In accordance with the present invention, these difficulties are avoided and overcome by the provision of a pressure sensitive relief valve which takes over control of the catapult internal pressure at a predetermined level and acts to regulate this pressure by dumping just enough gas to maintain the pressure at the desired level.

The invention will be better understood from the following description when considered in connection with the accompanying drawings and its scope is indicated by the appended claims.

Referring to the drawings:

Figs. 1 and 2 are explanatory curves relating to the operation of the device, and Fig. 3 illustrates a preferred embodiment of the device.

The mass ejection thruster device illustrated by Fig. 3 includes a base 10 which has a central opening 11 and is threaded to an outer casing 12. Concentric with the casing 12 are an inner tube 13 and an intermediate tube 14. The intermediate tube 14 is slidable within the casing 12 to an extent which is limited by a shoulder 15 near its lower end engaging a member 16 which is threaded to the casing 12. The inner tube 13 is slidable within the intermediate tube 14 and has threaded to its upper end a member 17 which surrounds a hollow member 18 and is connected to the man-seat mass to be ejected from the aircraft. It will be noted that seal rings 19 are interposed between the members 13 and 14 and that seal rings 20 are interposed between members 14 and 16.

Enclosed within the upper end of the inner tube 13 is an explosive cartridge 21 arranged to be fired by a pin 22 which is fixed to the members 17 and 18 by a shear pin 23. The firing pin 22 is adapted to be activated by a gas applied under pressure through an aperture 24 and is wedge-shaped intermediate its ends. Cooperating with this wedge-shaped part of the firing pin are a pair of locking members 25 and 26 by which the members 16 and 17 are interlocked in the illustrated position of the firing pin. As the firing pin 22 descends, however, the members 25 and 26 are drawn inwardly to unlock the members 16 and 17 so that the member 17 is freed for movement in response to the gas pressure generated by the firing of the cartridge 21.

It will be understood by those skilled in the art that the above described parts of the device are for the most part old and well known. The novel features of the present invention are now to be described.

It will be noted that the opening 11 in the base 10 is in the form of a tube extending upwardly from the base. To the exterior of this tubular extension is threaded a tube 27 which has ports 28 opening into the inner tube 13 wherein the gas incident to the firing of the cartridge 21 is generated. This gas is confined to the tubes 12, 13, and 14 and the lower end of tube 27 so long as its pressure is below a value predetermined by the force exerted by a spring 29 interposed between the closed end of the tub 27 and a piston 30 which has a sealing ring 31 and is connected through a rod 32 to a valve seat 33.

When this predetermined pressure of the gas is exceeded, however, the spring 29 is compressed and there is discharged through the opening 11 sufficient gas to restore the pressure to its predetermined value.

The advantage of this method of operation is made more apparent by consideration of the curves of Figs. 1 and 2.

Curves A, B and C of Fig. 1 indicate the relation between pressure in pounds per square inch and time in seconds at temperatures of +160° F., +70° F. and −65° F. The curve D represents a desired relation between pressure and time. Since the final velocity imparted to the ejected mass is proportional to the area enclosed by the various curves, it follows that there is a definite loss in performance when the device (as heretofore constructed) is operating below the maximum allowable temperature. Added to this loss is a further loss imposed by the chemical characteristics of the propellant.

The curves of Fig. 2 indicate the situation when the maximum gas pressure is regulated as explained in connection with Fig. 3. It will be noted that there is generated an abundant supply of propellant gas which, if completely contained wtihin the catapult, would cause it to operate at higher pressures than are consistent with the curve D of Fig. 1. With the various parts of the pressure sensitive valve properly proportioned, however, the final pressure within the catapult is regulated as indicated by the undulating curve F of Fig. 2. Fig. 2 also shows how the operation of the relief valve would tend to equalize the final velocities imparted to the man-seat combined mass over the range of operating temperatures.

Thus there is selected a propellant charge which will insure the generation of sufficient gas pressure at −65° F. for a sustained 20 G acceleration and any pressure above that is relieved by the valve formed by the parts 10 and 33. While the piston 30 is shown as relatively large, it is to be understood that the valve parts are light in weight and are so related as to avoid the possibility of resonant vibrations of the same period as the period of operation of the valve.

I claim:

1. In a thruster designed to operate under a wide range of ambient temperature conditions, the combination of a casing, a hollow thrust exerting member movable in and communicating with said casing, means for generating in said member a gas under a pressure in excess of that required to exert a predetermined thrust on said member under all of said temperature conditions, a tube forming an opening through a wall of said casing and extending into said member, a piston movable in said tube, a valve seat fixed to said piston and movable thereby to open and close said opening, and a spring arranged between said closed end and said piston to apply thereto a force such that said seat is moved to uncover said opening only when the pressure within said member exceeds said required pressure.

2. In a thruster for ejecting an aircraft seat, said thruster, having telescopically expansible tubes, a base, a connection at the top of the thruster for raising a seat mass, a cartridge adjacent one end of an inner one of said telescopic tubes, the combination therewith of the improvement for enhancing the efficiency of said thruster under widely different temperatures and for increasing the compactness of said efficiency enhancing improvement, said improvement including said cartridge having a larger than needed capacity for generating fluid pressure and a tubular housing for a poppet valve adjacent an opposite end portion of the inner one of said telescopic tubes from that in which said cartridge is carried, a venting passageway from the tube in which said cartridge is carried through said poppet valve to an outside of said thruster, and pressure sensitive control means for said valve, said means including a piston in said tubular housing and connected to said poppet valve, and a spring between said piston and said tubular housing, whereby said valve may be caused to repeatedly vent excess pressure and close afterward, and said valve and its control means are all compactly enclosed within said thruster.

References Cited in the file of this patent

UNITED STATES PATENTS

| | | |
|---|---|---|
| 329,354 | Asher et al. | Oct. 27, 1885 |
| 708,332 | Ennor | Sept. 2, 1902 |
| 1,874,682 | Woolson | Aug. 30, 1932 |
| 2,367,894 | Shore | Jan. 23, 1945 |
| 2,476,857 | Grafinger | July 19, 1949 |
| 2,499,379 | Garrett | Mar. 7, 1950 |
| 2,516,902 | Musser | Aug. 1, 1950 |
| 2,726,055 | Musser | Dec. 6, 1955 |
| 2,780,961 | Musser et al. | Feb. 12, 1957 |
| 2,815,008 | Hirt | Dec. 3, 1957 |

FOREIGN PATENTS

| | | |
|---|---|---|
| 14,814 | Great Britain | July 24, 1897 |
| 1,149,362 | France | July 8, 1957 |